Nov. 12, 1968   K. G. SKELDING   3,410,597
TONGS
Filed June 1, 1967   4 Sheets-Sheet 1
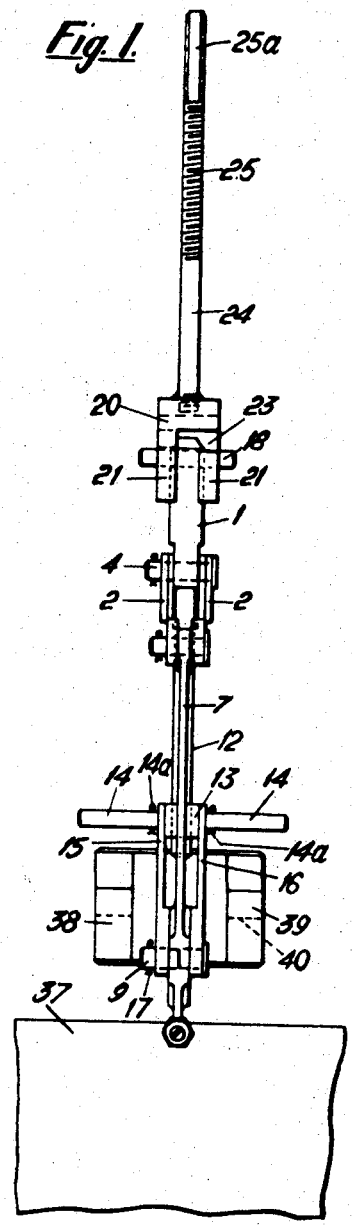
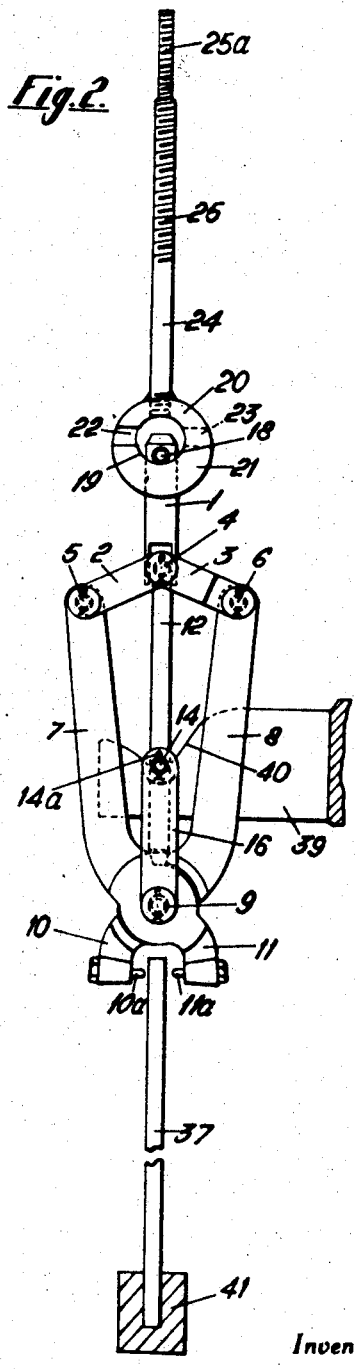
Inventor
Kenneth George Skelding
By
Morrison, Kennedy & Campbell
Attorneys Nov. 12, 1968  K. G. SKELDING  3,410,597
TONGS
Filed June 1, 1967  4 Sheets-Sheet 2
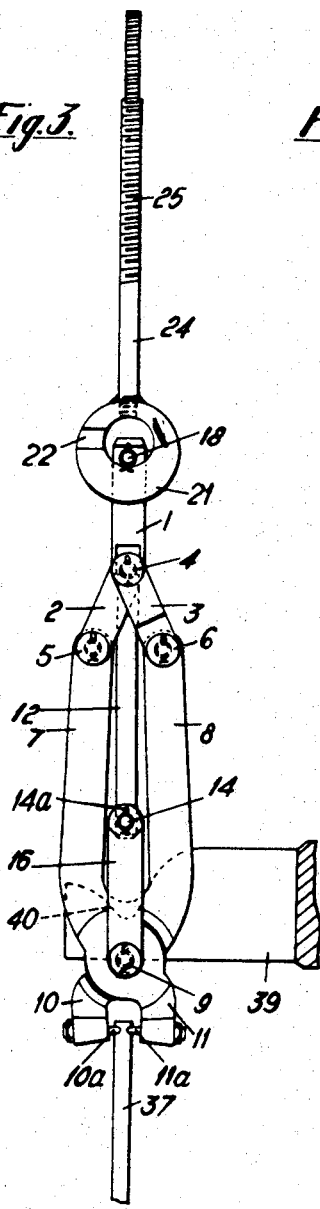
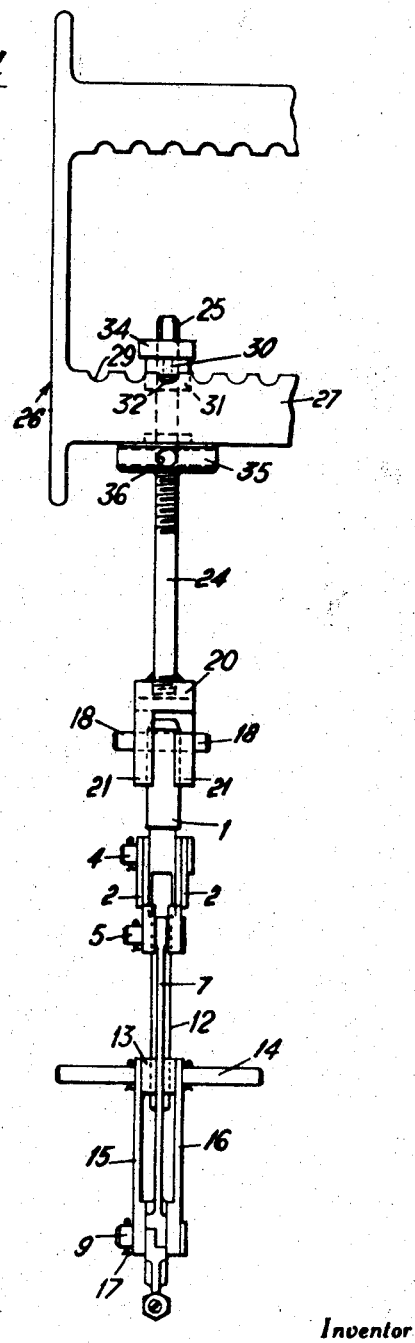
Inventor
Kenneth George Skelding
By
Morrison, Kennedy & Campbell
Attorneys

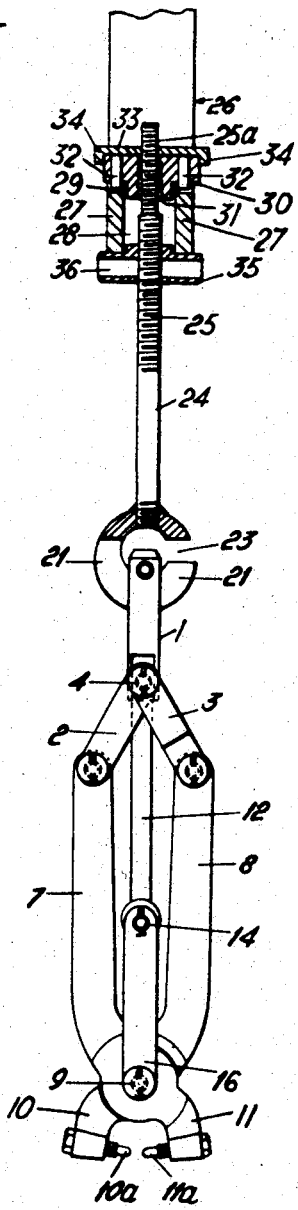

3,410,597
TONGS
Kenneth George Skelding, Birmingham, England, assignor to Pilkington Brothers Limited, Liverpool, Lancashire, England, a corporation of Great Britain
Filed June 1, 1967, Ser. No. 642,885
Claims priority, application Great Britain, June 6, 1966, 25,045/66
8 Claims. (Cl. 294—118)

ABSTRACT OF THE DISCLOSURE

Tongs of the kind having a pair of tong arms pivoted together at their lower ends and extending beyond the pivot to form jaws, and links connecting the arms to an upper pivot from which the tongs are suspended, the lower pivot being connected to a lifting member which runs on an extension of the suspending member in which the upper pivot is located.

BACKGROUND OF THE INVENTION

(1) Field of the invention

This invention relates to apparatus for suspending a glass sheet and a method of treating the glass sheet using said apparatus.

(2) Description of the prior art

It is conventional that a glass sheet which is to be treated in a process wherein the glass is heated to an elevated temperature be suspended by tongs upon which the glass is advanced through the appropriate treating zones. Known tongs have consisted of a pair of tong links respectively connected to a pair of tong arms, the tong links being mounted on an upper hinge pin and the tong arms being pivoted together at their lower ends by a lower hinge pin, and extending beyond that hinge pin to form the jaws of the tongs.

The loading and unloading of glass sheets onto tongs for a treating process has been most reliably performed by manual operation. The chief disadvantage of such operation is the high labour cost involved, and accordingly proposals have been made for automatic arrangements by which the glass sheets may be loaded onto the tongs and unloaded therefrom.

Previous proposals for automatic loading and unloading of glass sheets to and from tongs have resulted in damage to the upper edge of the glass sheets, and it is a main object of the present invention to provide tongs for suspending a glass sheet suitable for use in a process in which the glass sheet is automatically loaded onto the tongs and unloaded from them reliably and without damage to the upper edge of the glass sheet.

SUMMARY

According to the present invention, tongs for use in suspending glass in a vertical plane comprise a pair of tong arms pivoted together at their lower ends by a lower hinge pin and extending beyond that hinge pin to form the jaws of the tongs, a pair of tong links linking the upper ends of the tong arms to an upper hinge pin located in a suspending member for the tongs, and a lifting member connected to the lower hinge pin, which lifting member runs on a central guide member formed by a downward extension of the suspending member between the tong arms, so that movement of the lifting member relative to the guide member causes opening and closing of the tong jaws.

In a preferred embodiment of the invention lifting straps connect the lower hinge pin to a lifting member which runs on the central guide member.

With this construction the tongs have a rigidity which enables the opened jaws to be in a consistent position when the lifting member is raised relative to the upper hinge pin.

The provision of the central guide member along which the lifting member runs reduces the flexibility of tongs made from loosely pivoted links and members, with the result that, when these tongs are advanced into the loading station and are entirely free, the tongs have sufficient rigidity to enable the lifting member to be engaged and lifted by actuating fingers to open the jaws. Also the guiding of the lifting member on the central member in a defined path brings the opened jaws to a consistent position for the insertion of the upper margin of a glass sheet between the jaws without the glass sheet striking the jaws, thereby avoiding any chipping or other damage to the edge of the glass sheet.

The lifting member may be mounted directly on the lower hinge pin in which case the lower hinge pin runs on the central guide member. In the preferred embodiment of the invention the positioning of the lifting member above the lower hinge pin and therefore further from the point of engagement of the jaws of the tongs with the glass sheet ensures that, when the lifting member is raised preparatory to loading a glass sheet into the tongs, the movement of the tongs is a direct lift from which sideways swinging of the tongs is substantially eliminated, and the risk of damage to the glass sheet by unsymmetrical movement of the jaws over the top edge of the glass sheet is avoided.

There is the additional advantage that the positioning of the lifting member above the lower hinge pin permits the actuating fingers to pass more easily between the upper edge of the glass sheet and the lifting member to disengage when loading and to engage when unloading. If the glass sheet is to be bent, the mounting of the lifting member above the lower hinge pin results in the lifting member being well clear of the upper edge of the bending dies when these close onto the glass sheet, and thereby no additional clearance must be provided in the top edges of the bending dies.

The tongs themselves may be suspended in a number of ways, and in certain contexts, for example when a flat glass sheet for use as a motor vehicle ventilator or doorlight is to be toughened, the tongs may be suspended from a rigid suspension. In other cases, particularly where a plurality of tongs are to carry a long glass sheet which is to be bent as well as toughened, some rotational movement of the tongs must be permitted to accommodate the curvature which is imparted to the glass during the bending process, but at the same time, the rotational movement must not be so great that free tongs (i.e., tongs carrying no load) entering the loading station could rotate to positions at which the lifting member cannot be correctly engaged by the actuating fingers.

In accordance with another feature of the present invention, a limited rotational movement is permitted to the tongs by suspending the tongs by transverse pins extending on opposite sides of the suspending member, which pins rest on similar arcuate bearing surfaces of a support connected to a conveyor mechanism.

The invention also comprehends tongs as referred to above in combination with a hanger bolt for suspending the tongs, which bolt has a ring member fixed to its lower end, the lower part of which ring member is split to form two ring parts which are spaced apart and which have opposite portions cut away to permit insertion of the suspending member of the tongs into the ring member so that the transverse pins are supported on arcuate bearing surfaces of the ring parts.

In the preferred embodiment of the invention the upper end of the hanger bolt is formed with a thread, and the hanger bolt is clamped to parallel suspension rails of a tong suspension gate by nuts screwed on to the threaded end of the hanger bolt.

The upper edges of the suspension rails may be formed with a plurality of oppositely disposed locating grooves, and the lower face of the upper nut on the hanger bolt is shaped to seat into one pair of those grooves to locate the tongs positively on the suspension gate.

The present invention further includes the combination of tongs according to the invention with parallel actuating fingers mounted on a single actuating arm and each formed with a V-shaped groove in its upper surface, into which grooves arms on the lifting member engage, whereby the lifting member is moved by movement of the fingers.

The present invention also comprehends the use of apparatus for supporting a glass sheet, including tongs as herein described, in a method of treating a glass sheet, wherein the glass sheet is automatically loaded onto the tongs before the treatment and automatically unloaded after the treatment.

Further, therefore the present invention comprehends a method of treating a glass sheet, for example to toughen the glass, comprising the steps of opening, at a loading position, the jaws of vertically suspended tongs, having upper and lower hinge pins on which there are respectively pivoted a pair of tong links and a pair of tong arms, the jaws being opened by mechanically engaging and raising, on both sides of the tongs, a lifting member, which is associated with the lower hinge pin of said tongs and arranged to ride on a central vertical guide member in which the upper hinge pin is located, introducing the upper margin of a glass sheet between the open jaws of the tongs, lowering the lifting member to permit the jaws of said tongs to grip the upper margin of the glass sheet, advancing the glass sheet through a series of treating stations wherein the glass is treated, bringing the treated glass sheet to an unloading station, and mechanically engaging said lifting member on both sides of the tongs at said unloading station to raise the lifting member and open the jaws of the tongs to permit the treated glass sheet to be removed from between the jaws at the unloading station.

BRIEF DESCRIPTION OF THE DRAWINGS

FIGURE 1 is a front view of tongs in accordance with one example of the present invention, with the jaws of said tongs engaging an upper margin of a glass sheet, FIGURE 2 is a side view of the tongs of FIGURE 1 showing the tongs with their jaws open preparatory to gripping the upper margin of a glass sheet, FIGURE 3 is a side view of the same tongs showing the jaws engaging the upper margin of a glass sheet in the manner of FIGURE 1, FIGURES 4 and 5 together show a suspension for the tongs of FIGURES 1 to 3 by which the tongs are suspended from a conveyor mechanism for advancing the tongs through successive treating stations for a glass sheet held by the tongs.

In the drawings like references designate the same or similar parts.

DESCRIPTION OF THE PREFERRED EMBODIMENT

Figure 6:
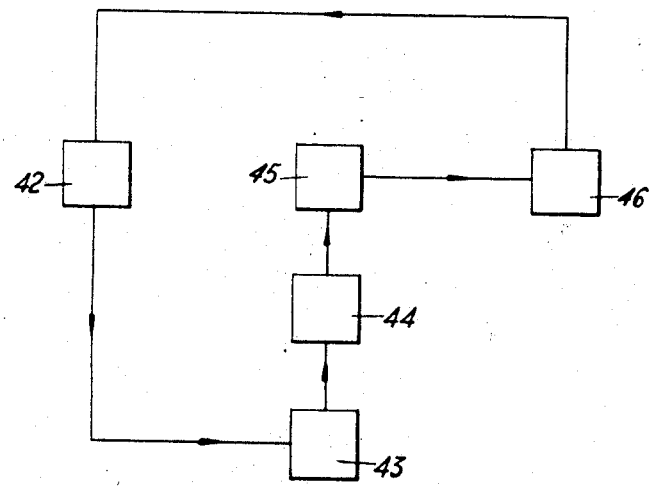
FIGURE 6 is a diagrammatic representation of a toughening process wherein glass is automatically loaded and unloaded onto tongs similar to the tongs illustrated in FIGURES 1 to 3.

In the drawings the reference 1 indicates a suspending bar for tongs which grip the upper margin of a sheet of glass suspended in a vertical plane from several tongs each connected by its suspending bar 1 to a conveyor mechanism by which the sheet of glass is carried through a furnace and, if so desired, through a quenching station where the heated glass is toughened.

To the lower end of the suspending bar 1 are pivoted a pair of identical tong links 2 and 3 by an upper hinge pin 4. The tong links are pivotally connected by hinge pins 5 and 6 to the upper ends of a pair of identical tong arms 7 and 8. The upper hinge pin 4 is above the level of the upper ends of the tong arms 7 and 8, which are bent towards each other at their lower ends (as in the manner of a pair of pincers) to be articulated on a lower hinge pin 9 and extended outwardly below the hinge pin 9 to form jaws 10 and 11 of the tongs. The jaws 10 and 11 are provided with tong points 10a and 11a for gripping the upper margin of a sheet of glass as shown in FIGURE 3.

The suspending bar 1 is extended downwardly between the tong arms 7 and 8 as a central guide rod 12 of reduced cross-section which passes through a bushing 13 carrying a pair of lifting arms 14.

The bushing 13 is associated with a pair of straps 15 and 16 which straps are apertured for the passage of the arms 14, to which they are secured by split pins 14a. At their lower ends the straps 15 and 16 pass over the lower hinge pin 9, being secured thereon by a split pin 17.

The lifting arms 14 can be lifted with respect to the fixed upper pivot 4 by the bushing 13 sliding up the central guide rod 12 to open the jaws 10 and 11 of the tongs. Extending on opposite sides of the suspending bar 1 are transverse pins 18 which are used to suspend the tongs by bearing on similar arcuate surfaces 19 of a split ring member 20, the lower part of which is split to form two ring parts 21 which are spaced apart and which have portions cut-away at 22 and 23 so that by rotation of the tongs the transverse pins 18 can be passed through the cut-away outlets 22 and 23, in the manner of a bayonet joint, and then withdrawn downwardly through the space between the two ring parts 21.

The split ring member 20 is welded to the lower end of a hanger bolt 24, the upper part of which is provided with a screw thread 25.

As shown in FIGURES 4 and 5, the upper end of the hanger bolt 24 is fixed to a tong suspension gate indicated generally by the reference 26, which forms a part of a conveyor mechanism for advancing a glass sheet suspended from the tongs fixed to the gate 26, through treatment zones.

The tong suspension gate comprises two lower parallel bars 27 mounted in side-by-side relationship and defining between them a channel 28 through which the threaded upper end 25 of each hanger bolt 24 passes. The upper edges of the bars 27 are each formed with a succession of transverse locating grooves 29.

The upper end 25 of the hanger bolt 24 is formed with side flats 25a which are shown in FIGURE 5 and whose function will be described below. A nut 30 of rectangular external shape is screwed on to the upper end of the hanger bolt and the position of the nut on the hanger bolt 24 determines the height of the tong points. The nut 30 has a central part 31 also of rectangular form which extends downwardly into the space between the bars 27 when the tongs are hung on the stong suspension gate, and two pins 32 vertically fixed into the lower face of the nut 30 engage in the appropriate grooves 29 in the upper edges of the bars 27 to determine the longitudinal position of the tongs on the gate.

When the nut 30 is in the exact required position on the hanger bolt to determine the vertical height of the tong points an anti-rotation piece 33 in the form of an inverted U-shaped piece is slipped over the end of the bolt 24. The downwardly extending portions 34 of the anti-rotation piece just fit over the shorter sides of the rectangular bolt 30 and the hole through the centre of the piece 33 is shaped just to fit over the end of the bolt 24 with flats to engage the flats 25a formed on the upper end of the bolt. The anti-rotation piece 33 thus locks the nut 30 against any rotation relative to the bolt 24 and ensures that the vertical setting of the tongs is maintained even if the tongs are taken from the gate. The rectangular shape of the nut 30 is such that it can pass freely through the space 28 between the two bars 27 and then be rotated to seat the nut on the top of the bars with the pins 32 engaged in the chosen grooves 29 in the top edges of the bars.

A lower nut 35 which had previously been screwed on to the threaded end 25 of the bolt 24 is then tightened up against the lower edges of the bars 27. During this tightening operation no rotation of the upper nut 30 is possible. Holes 36 through the lower nut 35 enable the nut to be turned with a tommy bar. The lower nut is illustrated as being of circular form but may be a hexagonal nut in which case it is not necessary to provide the holes 36.

By this arrangement for attaching each tong to the suspension gate, the tongs can be easily replaced or moved along the gate without endangering the setting of the height of the tong points relative to the suspension gate.

The operative position of the tongs, in which the jaws are close together, is shown in FIGURE 3 of the drawings, where a glass sheet 37 is shown gripped between the jaws by the tong points 10a and 11a which have become impressed into the surfaces of the glass sheet while the glass sheet was being heated to a temperature from which quenching in a toughening process took place. The position of the jaws 10 and 11 in FIGURE 3 is the operative position of the jaws, and, in order that the glass sheet may be initially inserted, the jaws 10 and 11 are opened.

In accordance with this aspect of the present invention which provides for automatic loading and unloading of glass sheets from the tongs, there are provided parallel actuating fingers 38 and 39 (see FIGURES 1, 2 and 3) which are mounted on a single actuating arm and are formed with V-shaped grooves 40 in their upper surfaces into which grooves the lifting arms 14 engage.

The central guide rod 12 on which the bushing 13 rides imparts rigidity to the tongs even when they are not carrying any load.

The suspension of the tongs by means of the transverse pins 18 resting on the similar arcuate surfaces 19 of the ring member 20 prevents any substantial rotation of the tongs 1 as they are advanced by the conveyor mechanism.

The combination of the rigidity of the tongs according to the invention and the prevention of substantial rotation of the tongs ensures that the tongs can be brought accurately to a position in which the lifting arms 14 can be accurately registered in the grooves 40 in the actuating fingers 38 and 39.

When the tongs are in position, the actuating fingers 38 and 39 are raised beneath the lifting arms 14 so that the bushing 13 slides up the rod 12 and the lower hinge pin 9 is raised by the straps 15 and 16. This results in opening of the jaws of the tongs to the position illustrated in FIGURE 2 which shows that there is ample space between the tong points 10a and 11a for the upper margin of a glass sheet to be introduced.

When loading the tongs, immediately following the opening of the jaws 10 and 11 by the lifting action of the actuating fingers 38 and 39, the glass sheet 37 to be gripped is raised by two U-shaped support cradles 41 and guided into a position between the jaws 10 and 11 as shown in FIGURE 2. The actuating fingers 38 and 39 are then lowered so that the jaws 10 and 11 grip the upper margin of the glass sheet 37. Then the support cradles 41 are lowered, leaving the glass sheet 37 suspended from the tongs.

The glass sheet is then treated by being advanced in stages through a series of treating stations indicated diagrammatically in FIGURE 6. The loading station is indicated at 42 in FIGURE 6, and from the loading station the tongs carrying the glass sheet are advanced by the conveying mechanism to a furnace 43 where the glass sheet is heated to a temperature of the order of 700° C., which is approaching the softening temperature of the glass. The glass sheet is then conveyed to a bending station 44 at which the glass sheet is bent, for example between bending dies, so that a desired curvature is imparted to it. From the bending station 44, the glass sheet is moved to a quenching station 45 at which the hot glass sheet is rapidly chilled by a quenching medium directed from opposed quenching frames brought near to the opposite faces of the curved glass sheet.

The glass sheet 37 is then passed to an unloading station 46 at which the glass sheet is supported by support cradles similar to the cradles 41, and is then released from the tongs by the action of a pair of actuating fingers similar to the actuating fingers 38 and 39 already described, which raise the lifting arms 14 and so open the jaws 10 and 11. The quenched glass sheet is then removed in the cradles for further cooling, inspection and packing.

From the unloading station 46, the tongs are advanced by the conveying mechanism to the loading station 42 where they are opened to grip a further glass sheet to be loaded and subjected to the process of treatment.

In practice, where a large sheet of glass such as a sheet of glass to be bent for use, for example as a vehicle windscreen or backlight is being treated, a plurality of tongs support the glass sheet, and these are operated simultaneously by a set of actuating fingers 38 and 39 at the loading and unloading positions.

In the apparatus which has been described in accordance with the present invention, the loading of the glass sheet into the tongs is effected without having to use the top edge of the glass sheet to open and close the tong jaws. Furthermore, in the apparatus in accordance with the present invention, once the weight of the glass sheet has been taken by the tongs, the glass sheet remains stationary relative to the tong suspension gate until the jaws of the tongs have been opened in the unloading stage of the process. Previous proposals for automatic unloading have involved a movement of the glass sheet to open the jaws of the tongs and release the glass sheet, and this has given rise to superficial damage on the edge of the finished product which is the toughened glass sheet.

By the present invention there are provided tongs which are simple and compact and can readily replace conventional tongs without any modifications to the furnace and other apparatus through which a glass sheet to be toughened is passed.

The suspension of the tongs as herein described resists but does not entirely eliminate rotational movement about a vertical axis. The resistance to rotation increases rapidly with the angle of rotation, but the tongs are capable of the amount of rotational movement usually necessary to accommodate a bend in the hot glass sheet.

The suspension of the tongs as herein described is one which causes rapid damping of any oscillation of the tongs following a movement from one stage to the next in the treatment of the suspended glass sheets.

Defective tongs can be quickly replaced in a time less than thirty seconds, without any interruption to the furnace cycle and without the need for a more than minor adjustment to the apparatus as a whole.

By the use of the embodiment of the invention herein described, there is obtained accuracy of alignment of glass suspension tongs which employ slack hinge pins and links so that freedom of movement of the tongs is retained at all times in spite of differential expansion and any scaling of the metal of the tongs in the furnace.

I claim:

1. Tongs intended for use in suspending glass in a vertical plane, comprising a pair of tong arms pivoted together towards their lower ends by a lower hinge pin and extending beyond that hinge pin to form the jaws of the tongs, a pair of tong links each pivoted at one end to the upper end of one of said tong arms and pivoted at its other end to an upper hinge pin secured to a suspending member for the tongs, at least one strap pivoted to said lower hinge pin and spaced therealong from said lower hinge pin, pivoted to a lifting member running on a central guide member formed by a downward extension of and fixed to the suspending member between the tong arms, so that a running movement of the lifting member on the guide member causes opening and closing of the tong jaws.

2. Tongs intended for use in suspending glass in a vertical plane, comprising a pair of tong arms pivoted together at their lower ends by a hinge pin and extending beyond that hinge pin to form the jaws of the tongs, a pair of tong links linking the upper ends of the tong arms to an upper hinge pin located in a suspending member for the tongs, a central guide member formed by a downward extension of the suspending member between the tong arms, and lifting straps connecting the lower hinge pin to a transversely-extending lifting member which runs on the central guide member so that movement of the lifting member up and down the guide member causes opening and closing of the tong jaws.

3. Tongs according to claim 2 wherein the suspending member has transverse elements which rest on similar arcuate bearing surfaces of a support connected to a conveyor mechanism.

4. Tongs intended for use in suspending glass in a vertical plane, comprising a pair of tong arms pivoted together at their lower ends by a lower hinge pin and extending beyond that hinge pin to form the jaws of the tongs, a pair of tong links linking the upper ends of the tong arms to an upper hinge pin located in a suspending member for the tongs, and a lifting member connected to the lower hinge pin, which lifting member runs on a central guide member formed by a downward extension of the suspending member between the tong arms, so that movement of the lifting member relative to the guide member causes opening and closing of the tong jaws, wherein the tongs are suspended by transverse pins extending on opposite sides of the suspending member, which pins rest on similar arcuate bearing surfaces of a support connected to a conveyor mechanism, in combination with a hanger bolt for suspending the tongs, which bolt has a ring member fixed to its lower end, the lower part of which ring member is split to form two ring parts which are spaced apart and which have opposite portions cut away to permit insertion of the suspending member of the tongs into the ring member so that the transverse pins are supported on arcuate bearing surfaces of the ring parts.

5. Apparatus according to claim 4, wherein the upper end of the hanger bolt is formed with a thread, and the hanger bolt is clamped to parallel suspension rails of a tong suspension gate by nuts screwed on to the threaded end of the hanger bolt.

6. Apparatus according to claim 5, wherein the upper edges of the suspension rails are formed with a plurality of oppositely disposed locating grooves, and the lower face of the upper nut on the hanger bolt is shaped to seat into one pair of those grooves to locate the tongs positively on the suspension gate.

7. Tongs intended for use in suspending glass in a vertical plane, comprising a pair of tong arms pivoted together at their lower ends by a hinge pin and extending beyond that hinge pin to form the jaws of the tongs, a pair of tong links linking the upper ends of the tong arms to an upper hinge pin located in a suspending member for the tongs, and lifting straps connecting the lower hinge pin to a lifting member which runs on a central guide member formed by a downward extension of the suspending member between the tong arms, so that movement of the lifting member up and down the guide member causes opening and closing of the tong jaws, in combination with parallel actuating fingers mounted on a single actuating arm and each formed with a V-shaped groove in its upper surface, into which grooves arms on the lifting member engage, whereby the lifting member is moved by movement of the fingers.

8. A method of treating a glass sheet, for example to toughen the glass, comprising the steps of opening, at a loading position, the jaws of vertically suspended tongs, having upper and lower hinge pins on which there are respectively pivoted a pair of tong links and a pair of tong arms, the jaws being opened by mechanically engaging and raising, on both sides of the tongs, a lifting member, which is associated with the lower hinge pin of said tongs and arranged to right on a central vertical guide member in which the upper hinge pin is located, introducing the upper margin of a glass sheet between the open jaws of the tongs, lowering the lifting member to permit the jaws of said tongs to grip the upper margin of the glass sheet, advancing the glass sheet through a series of treating stations wherein the glass is treated, bringing the treated glass sheet to an unloading station, and mechanically engaging said lifting member on both sides of the tongs at said unloading station to raise the lifting member and open the jaws of the tongs to permit the treated glass sheet to be removed from between the jaws at the unloading station.

References Cited

UNITED STATES PATENTS

| | | | |
|---|---|---|---|
| 2,476,169 | 7/1949 | White et al. | 294—118 |
| 3,051,521 | 8/1962 | Skowron | 294—119 |

RICHARD E. AEGERTER, *Primary Examiner.*

R. D. GUIOD, *Assistant Examiner.*

UNITED STATES PATENT OFFICE
CERTIFICATE OF CORRECTION

Patent No. 3,410,597                                                    November 12, 1968

Kenneth George Skelding

It is certified that error appears in the above identified patent and that said Letters Patent are hereby corrected as shown below:

Column 4, line 59, "stong" should read -- tong --. Column 8, line 32, "right" should read -- ride --.

Signed and sealed this 3rd day of March 1970.

(SEAL)
Attest:

Edward M. Fletcher, Jr.                                  WILLIAM E. SCHUYLER, JR.
Attesting Officer                                                    Commissioner of Patents